Oct. 18, 1960 L. J. BISHOP 2,956,514
DROP SECTION FOR OVERHEAD CONVEYOR
Filed March 17, 1958 8 Sheets-Sheet 1
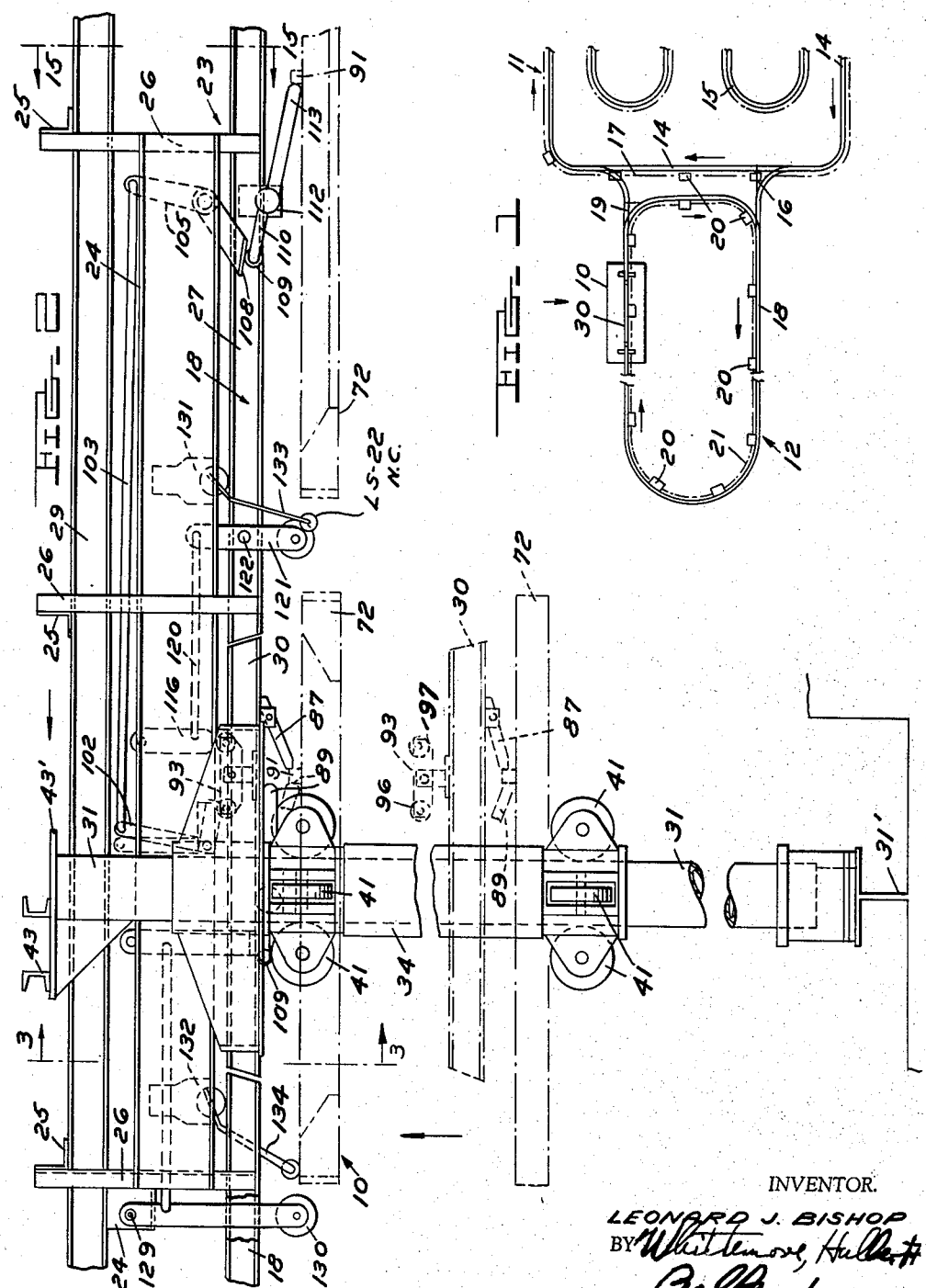
INVENTOR.
LEONARD J. BISHOP
BY
ATTORNEYS Oct. 18, 1960  L. J. BISHOP  2,956,514
DROP SECTION FOR OVERHEAD CONVEYOR
Filed March 17, 1958  8 Sheets-Sheet 2
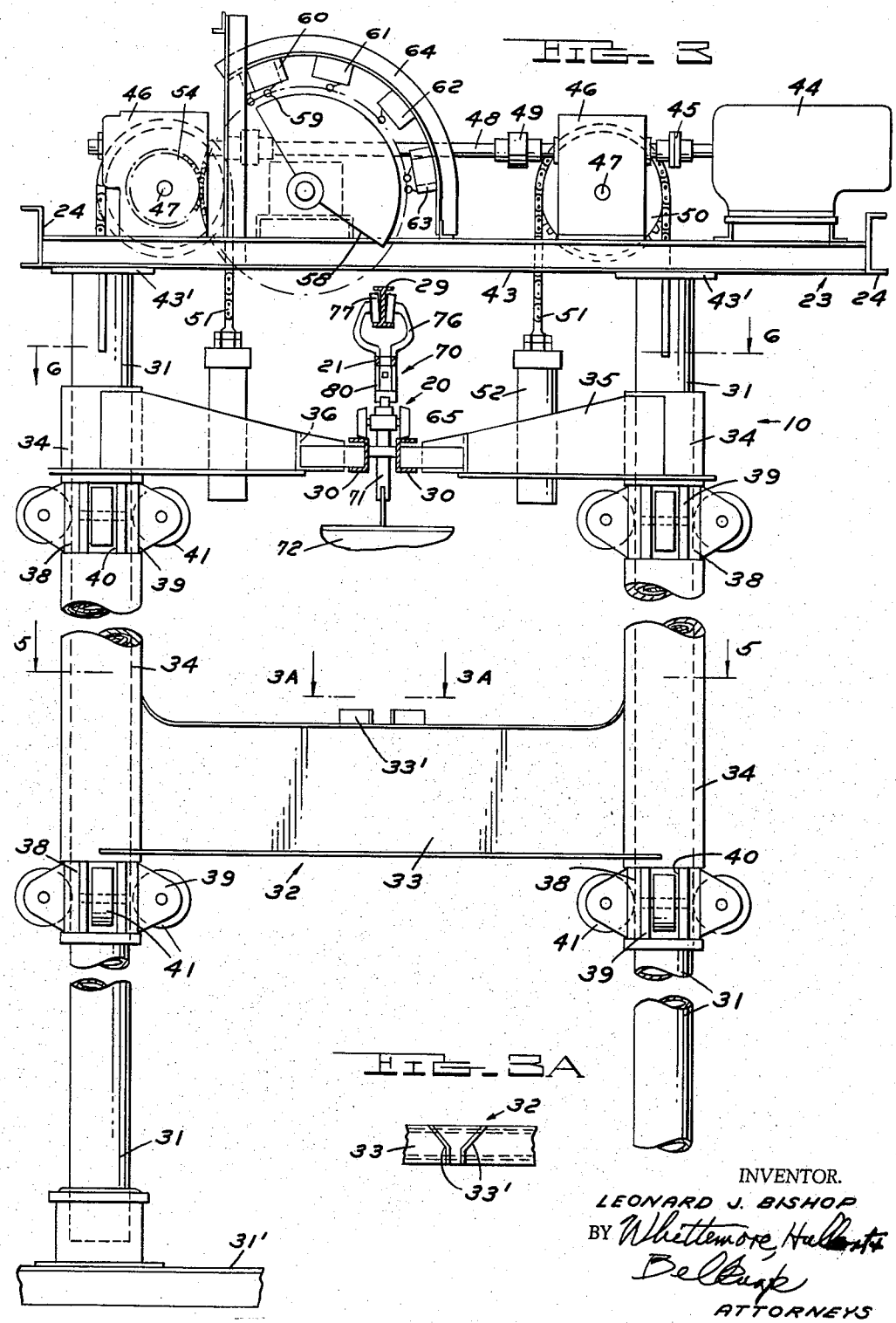
INVENTOR.
LEONARD J. BISHOP
BY Whittemore, Hulbert
Belknap
ATTORNEYS

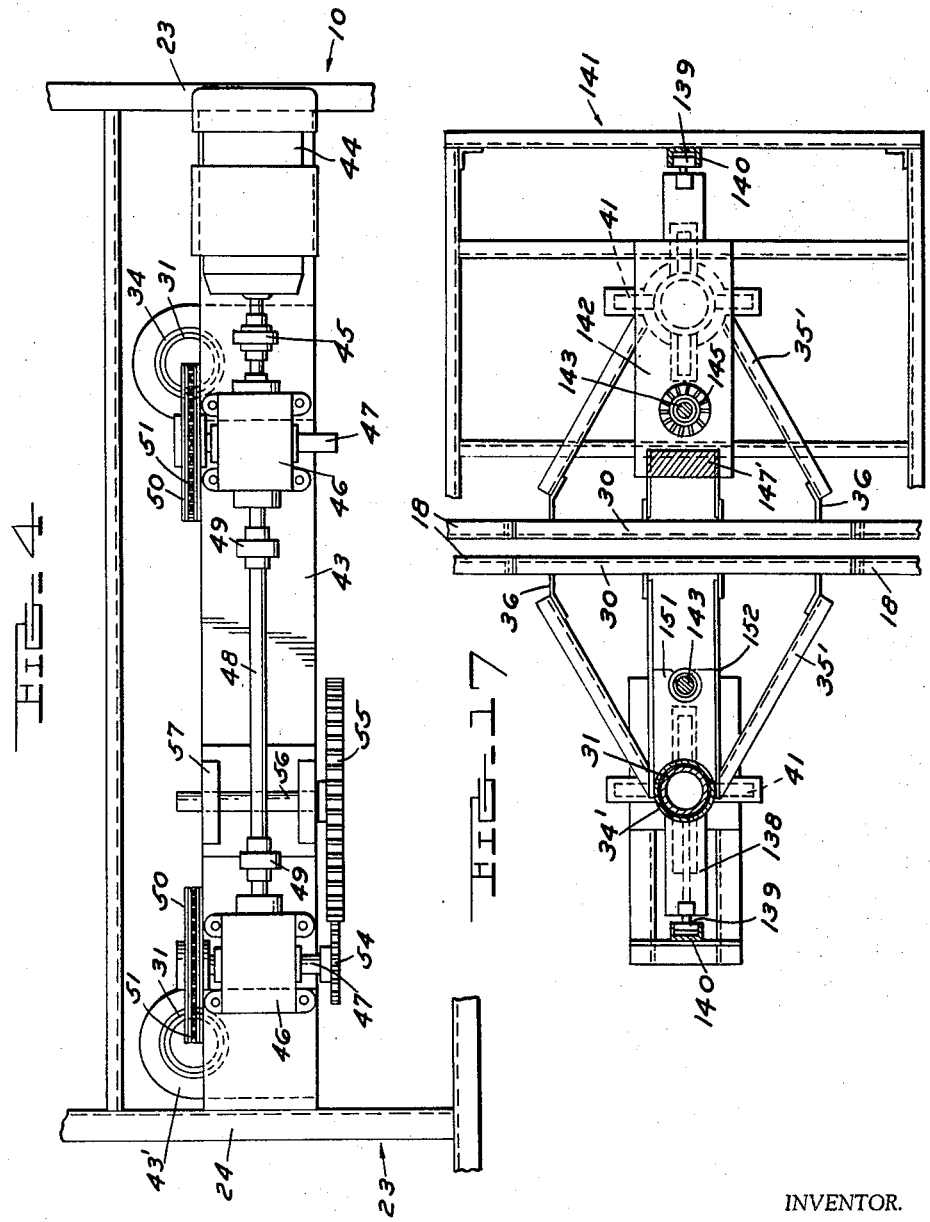

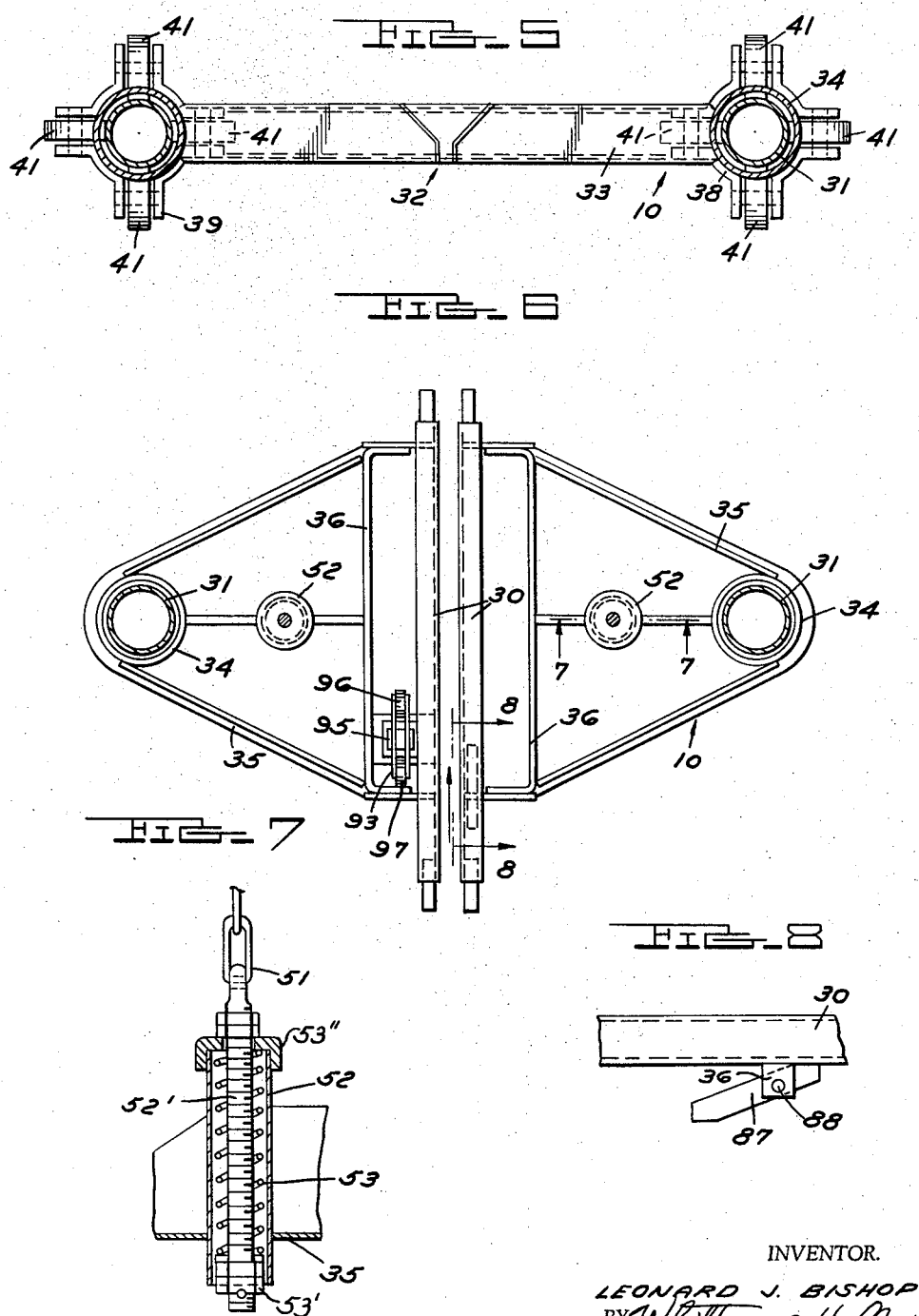

Oct. 18, 1960 L. J. BISHOP 2,956,514
DROP SECTION FOR OVERHEAD CONVEYOR
Filed March 17, 1958 8 Sheets-Sheet 5
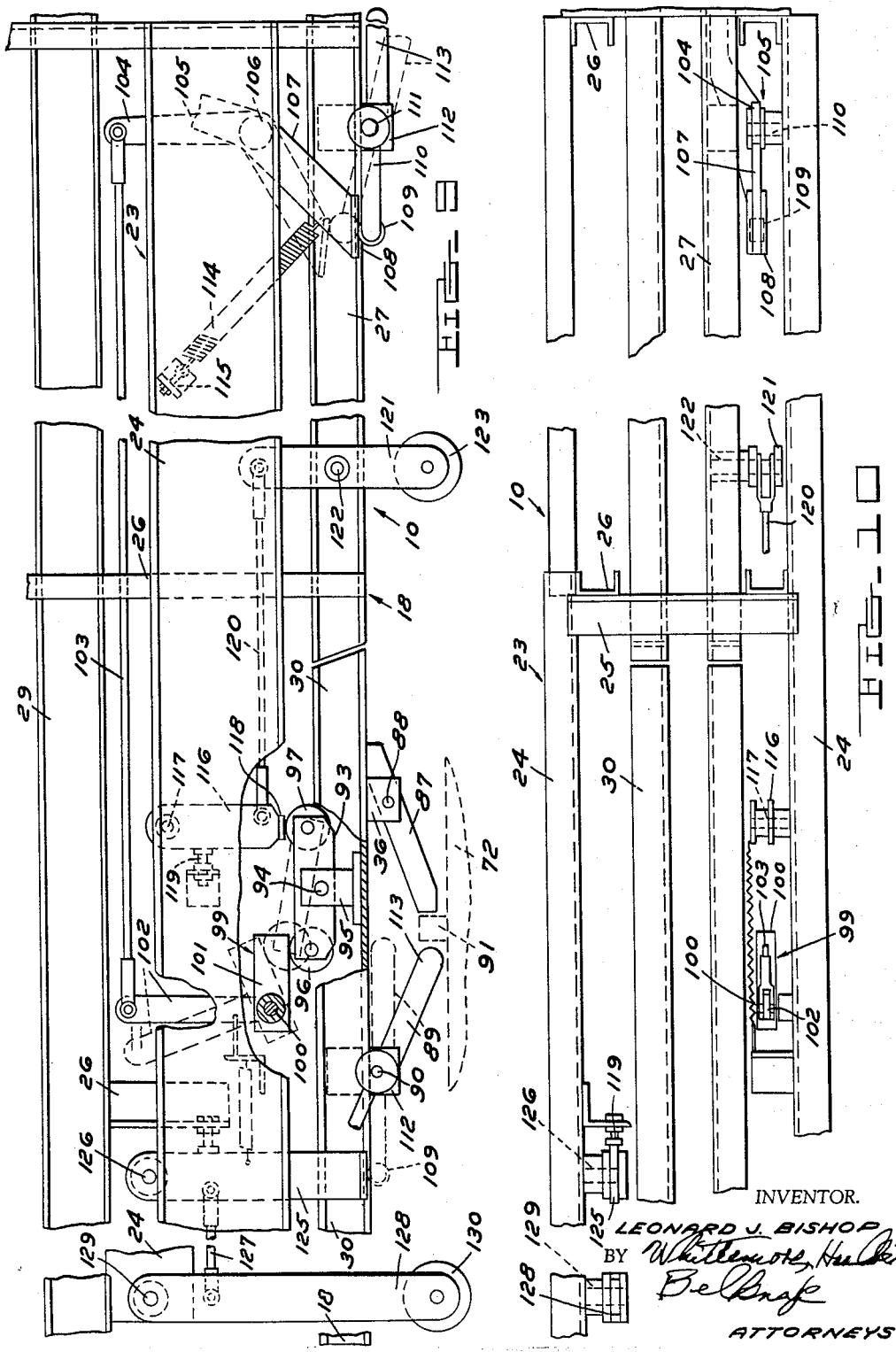
INVENTOR.
LEONARD J. BISHOP
BY
ATTORNEYS

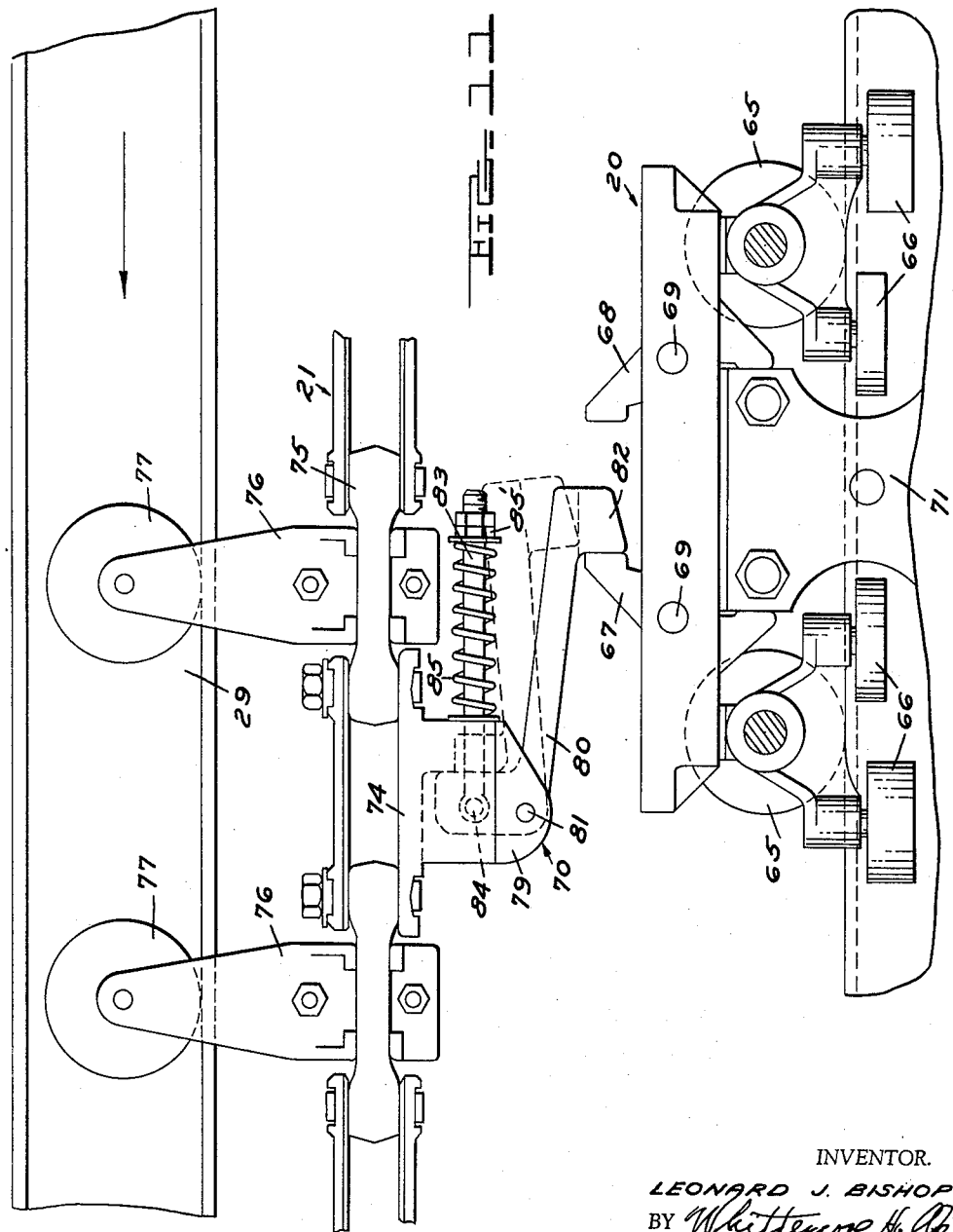

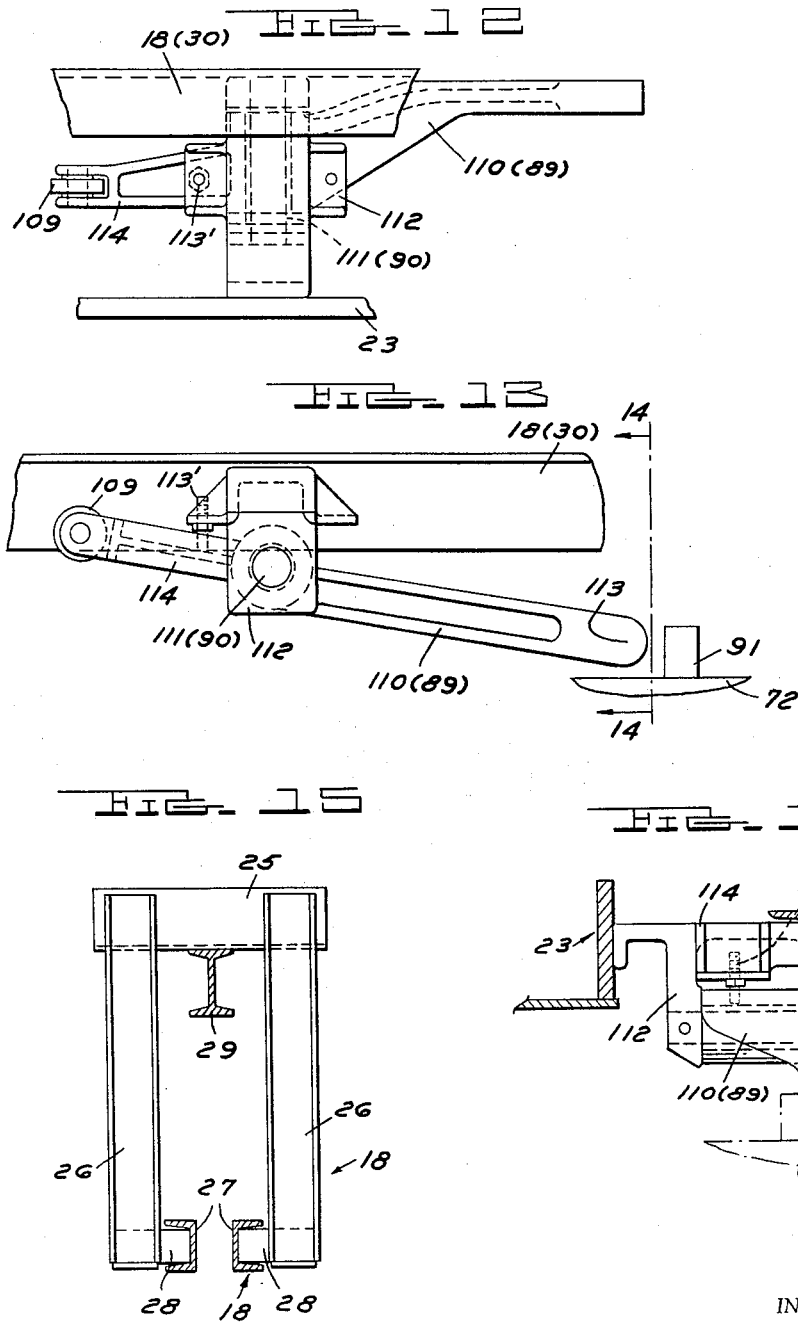

INVENTOR.
LEONARD J. BISHOP

United States Patent Office 2,956,514
Patented Oct. 18, 1960

2,956,514

DROP SECTION FOR OVERHEAD CONVEYOR

Leonard J. Bishop, Birmingham, Mich., assignor to Mechanical Handling Systems, Inc., Detroit, Mich., a corporation of Michigan Filed Mar. 17, 1958, Ser. No. 722,000

25 Claims. (Cl. 104—128)

The present invention relates to an improved drop section for an industrial overhead conveyor system characterized by an overhead power chain or like endless driver having provision for propelling load supporting trolleys or like work carriers along a horizontal overhead track, with the trolleys ordinarily controlled by suitable switch means as to their travel to and from angularly related track reaches.

In the interest of enabling a maximum occupancy of factory space by productive equipment and personnel, it is frequently desirable to maintain a number of trolleys, loaded at any given time with work to be processed, in continuous circulation in an elevated storage plane, with a drop section or sections lowering the trolleys and work, as required, in a processing area or areas, then returning the same upwardly for further elevated travel, as to a further processing zone, an inspection or testing station, and the like.

In an illustrative installation of the drop section of the invention, it permits a vertical downward traverse of the work carrier or trolley for a dip tank operation on the work in a plane beneath its normal plane of horizontal movement, followed by a return when the work has been dipped.

It is therefore a general object of the invention to provide an improved conveyor drop section in which the overhead trolley driving power chain can be brought directly and without diversion through the vertical zone of the drop section, avoiding the need for supplemental trolley advancing provisions heretofore necessary in order to prevent interference with the chain.

More specifically, it is an object of the invention to provide a drop section as described, in which a drop section track onto which the trolleys are successively advance and latched in place, is carried for reversing vertical traverse over a drop and return path of extensive height by a support which is open at its top throughout a vertical zone extending upwardly past the power chain, in any possible position of the track, so that interference with the chain is impossible.

In accordance with another object the drop section track is constituted by a pair of laterally spaced track lengths aligned with further fixed trolley tracks at either end thereof when in operative position, the respective drop section track lengths being individually supported from opposite sides thereof by cantilever arms mounted for guided vertical movement on upright column means.

In one embodiment of the invention the cantilever arms are joined rigidly by an underslung type, upwardly facing U-shaped support or drop frame, enabling the power chain to continue its longitudinal advance through the drop section zone without interference. In this form, motor driven flexible chains lower and raise the drop frame and cantilever-sustained track lengths.

In another embodiment, it is an object of the invention to provide a drop section wherein the drop section track lengths are individually sustained by opposed cantilever elements having vertically guided movement upon upright columns, these elements being powered up and down by coordinately driven vertical screws.

Another object is to provide an automatic control for a drop section featuring simplified but reliable mechanical linkages to insure against the forwarding of an approaching trolley to the drop section so long as the drop section track is already occupied by a previous trolley, either at the level of the approach trolley or in vertical traverse.

Yet another object is to provide a drop section in which electrical limit switches are coordinated with an otherwise all mechanical control linkage to insure properly timed, motor energized vertical movements of the drop section in coordination with the approach and departure travel of loads relative to the track of the drop section.

The foregoing as well as other objects will become more apparent as this description proceeds, especially when considered in connection with the accompanying drawings illustrating preferred embodiments of the invention, wherein:

Fig. 1 is a schematic top plan view showing a typical layout of the improved drop section in association with overhead storage and branch trolley circulating tracks;

Fig. 2 is a fragmentary view of the drop section, in side elevation, illustrating its relationship to an overhead power chain track or monorail, and to aligned overhead trolley tracks between which the drop section track is disposed, this view also indicating the general nature of the control provisions for the structure;

Fig. 3 is a view in vertical transverse section through the drop section, on a line approximating the line 3—3 of Fig. 2, particularly showing the operating and guide provisions for the drop section;

Fig. 3A is a fragmentary plan view, from line 3A—3A of Fig. 3;

Fig. 4 is a top plan view of the operating provisions of Fig. 3;

Figure 16:
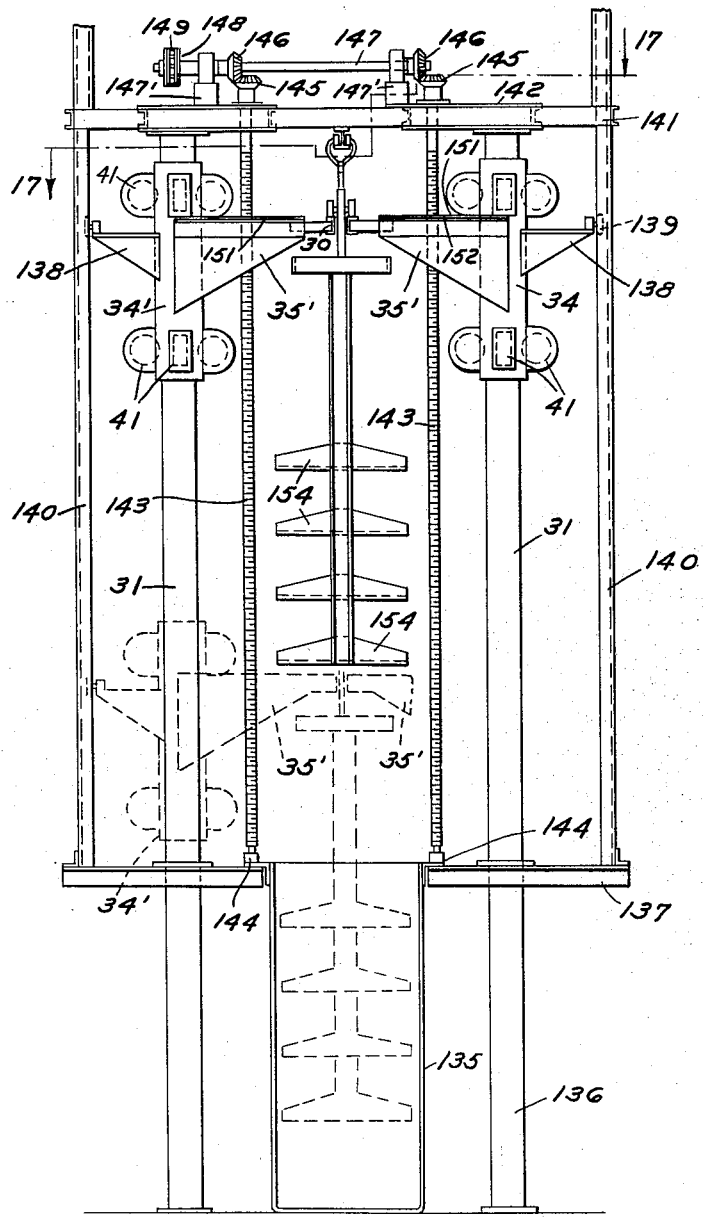

Figs. 5 and 6 are views in horizontal section from the respective lines 5—5 and 6—6 of Fig. 3;

Figs. 7 and 8 are, respectively, views in vertical section along lines 7—7 and 8—8 of Fig. 6;

Fig. 9 is a fragmentary and partially broken away view in side elevation, generally similar to Fig. 2 but in larger scale, illustrating in solid and dotted lines the operation of the control linkages for the drop section;

Fig. 10 is a fragmentary top plan view of the structure of Fig. 9;

Fig. 11 is a fragmentary view in side elevation showing an improved spring type chain dog for advancing the trolleys to and through the drop section, with provision for automatically disengaging a trolley at any time its forward movement is positively halted, as when it has been properly positioned on the drop section;

Fig. 12 is a fragmentary top plan view of a stop or latch arm sub-assembly of the control provisions;

Fig. 13 is a fragmentary view in side elevation of this assembly, showing the arm in a load halting position;

Fig. 14 is a view in vertical end elevation and section, as from the line 14—14 of Fig. 13;

Fig. 15 is a view in transverse vertical section showing the basic overhead track power and trolley structure, as viewed from the line 15—15 of Fig. 2;

Fig. 16 is a transverse vertical sectional view through a modified type of drop section to perform a dip-tank operation; and Fig. 17 is a fragmentary view in horizontal section along line 17—17 of Fig. 16.

Referring first to Fig. 1 of the drawings, it shows a typical installation of a drop section 10 according to the invention in an overhead or monorail type industrial conveyor system. Although it should be understood that the drop section 10 lends itself, in any desired number, for use in many different sorts of factory lay-out, that of Fig. 1 is a simple one well suited as an illustration.

There is schematically depicted in Fig. 1 a conventional storage section 11 of the system, in which it may be assumed that work components to be assembled, painted or otherwise processed or serviced, having been loaded upon load carriers of the type hereinafter described, are continuously circulated by endless chain and trolley means until diverted from the storage section 11 to a further branch conveyor portion or section 12 of the system, with which the drop section 10 is associated.

In any contemplated installation, it is the function of the drop section 10 to serve as a vertical transition section, at which the carrier and its load are bodily dropped beneath the branch conveyor portion 12 to a floor level, pit or the like, where the work load may be removed for any indicated operation thereon. The drop section, including its trolley and load supporting track, then returns to registered alignment of the track with the track of branch 12 for further travel along the same, as to another drop section, to another branch (not shown), or possibly back onto the storage portion 11.

In a typical installation of this sort, the loading conveyor portion 11 will be provided, as shown in Fig. 1, with a conventionally illustrated endless track, generally designated 14, having appropriate power chain and trolley rails or track members of the overhead type herein shown and hereinafter described. Thus for greater storage capacity the track 14 may include a serpentine portion 15 along which a large number of work carriers may circulate continuously in the direction indicated by arrows, prior to being diverted to the drop section portion 12, as through the agency of a suitable switch 16 at the junction point of the two conveyor portions 11, 12.

In traveling about the storage portion 11 the load carriers are propelled positively by a suitably powered, schematically shown, endless overhead drive chain 17. Branch track structure of the drop section portion 12 is also schematically illustrated at 18, being shown of U-shaped outline merging laterally with the storage track 14 at the zone of switch 16, as well as a switch 19 at a return or re-entry zone.

The load carriers of Fig. 1 are designated 20, being typified by trolleys and the load carriers which they sustain, such as appear in Figs. 3, 9, 11 and 16 and will be hereinafter described. An endless power chain, generally designated 21, propels the trolleys 20 in an orbit through the drop section portion 12.

Referring now to Figs. 2, 9, 10 and 15, the reference numeral 23 generally designates a suitably braced supporting superstructure for the conveyor system, in particular the drop section portion 12 thereof. This may consist of appropriate rigid horizontal channels 24 extending longitudinally in the direction of the track 18, transverse bracing angle irons 25, upright angle iron hangers 26, and the like. As particularly shown in Fig. 15, the track 18 comprises a pair of parallel, transversely spaced and oppositely facing channels 27, on the upper flanges of which the trolleys 20 roll, which chains are rigidly braced and supported on the hangers 26 by suitably arranged and welded spacers 28.

The superstructure 23 also rigidly supports the chain trolley or power track 29 in the form of an I-beam along which power chain trolleys roll; as well as operating linkages involved in the control of the drop section 10, all as hereinafter described in detail.

Referring now to Figs. 2, 3 and 4, the drop section 10 essentially comprises a pair of longitudinally extending track lengths 30 in the form of parallel channels identical in section with and disposed in the same lateral spacing as the trolley tracks 18. Tracks 30 are, in their operative, trolley-receiving position, disposed in a gap zone between the tracks 18, in respective longitudinally registered alignment with the tracks 18.

As shown in Figs. 2, 3, 5 and 6, a pair of rigid upright tubular columns 31 of cylindrical section are disposed one on either side of the drop section tracks 30, the columns 31 extending upwardly (Fig. 2) from a floor pit or the like, in which they foot on a beam 31', to the superstructure 23, in this case a transversely extending mounting plate to be described. The columns 31 serve as sliding supports or ways for an underslung drop frame 32 of upwardly opening, U-shaped outline, including a bottom cross beam 33 (Figs. 3 and 5) welded or otherwise secured to vertically elongated sleeves 34 encircling the respective columns 31.

As shown in Figs. 3 and 3A, the cross beam 33 is preferably provided on its top surface with anti-sway guides 33', between which a suitable member (not shown) on a carrier forwarded by the trolley enters. They act to restrain the carrier against lateral swing in the direction of beam 33.

At their upper ends the sleeves 34 are each provided with a welded inwardly extending cantilever support 35. As illustrated in Fig. 6, the supports 35 are welded iron construction in a generally triangular outline with their sides diverging toward the respective drop section tracks 30 for a stable and strong engagement with the latter; and the tracks 30 are mounted on the inner extremities of the cantilever supports 35 by suitable spacers 36.

In order to guide the sleeves 34 accurately for up and down movement on columns 31, each is provided with a pair of longitudinally spaced guide wheel housings 38, one immediately beneath the cantilever arm 35 and one immediately beneath the cross beam 33.

As appears in Figs. 5 and 6, the sleeves 35 have substantial radial clearance relative to the tubular columns 31 which they surround, and the wheel housings 38 are provided with outward bifurcations or forks 39 at 90° spacing therearound, with a vertically elongated wheel clearance aperture 40 opening through the wall of the sleeve between each of the forks 39. Anti-friction wheels are journaled between each of the several forks 39, extending inwardly for contact with the respective columns 31 along four equally spaced lines of rolling engagement. This provides a very accurately guided travel of the drop frame 32 along columns 31, insuring that the drop tracks 30 will be at all times maintained in accurate spacing.

The columns 31 afford support at their top, well above the drop frame 32 and the power track 29, for a relatively wide, transversely extending, plate-like mounting platform 43 (Figs. 3 and 4), upon which the provisions for raising and lowering the drop frame and load are supported. Supplemental braced and apertured bracket plates 43' are applied to the open tops of the columns to connect the latter to the mounting plate 43, with the columns in laterally offset relation to an edge of plate 43, so as to expose their tops.

The provisions for raising and lowering the underslung drop frame 32 include a suitably wired electric reversing motor 44 appropriately mounted adjacent one end of platform 43. Motor 44 is of, say, 3 horsepower and 2 speed rating, and its shaft is connected through a flexible coupling 45 with a worm gear type speed reducer 46 also supported on platform 43. This reducer may have a reduction ratio of, for example, 60:1, and its output shaft is indicated at 47.

The reducer 46 is connected through a transverse horizontal shaft 48 and appropriate couplings 49 with a similar speed reducer 46 adjacent and above the other column 31. Sprockets 50 are fixed on the shafts 47 of the speed reducers 46, and flexible operating chains 51 are trained about the respective sprockets 50, with one end of each chain 51 operatively connected to one of the drop frame cantilever arms 35.

This is accomplished by means of a suitably cushioned coupling device of the character shown in Fig. 7, including a tubular upright housing 52 fixed on the arm 35, in which housing a threaded rod 52' on the chain is received for relative axial movement. A coil compression spring 53 surrounds rod 52' within housing 52, acting between a top housing cap and an abutment nut 53' adjustably threaded on the lower end of the rod. The other end of each chain extends into the open top of one of the columns 31, within which it carries a suitable counterweight (not shown) to take up slack.

One of the speed reducers 46 has a pinion 54 secured on its shaft which meshes with a large diameter gear 55, the shaft 56 of which is appropriately journaled in suitable bearing blocks 57 on mounting platform 43. The gear shaft 56 also has fixed thereon a segmental limit switch operating plate 58, which plate progressively engages and actuates the operating arms 59 of a plurality of start-stop, reversing and speed control limit switches 60, 61, 62 and 63, which are supported by an appropriate arcuate bracket 64 atop the mounting platform 43. The operation of the drop section motor 44, to the extent pertinent to the present description, involves the operation of the limit switches 60–63 under the control of certain further carrier operated limit switches, to be described.

Now considering Fig. 11 of the drawings in conjunction with Fig. 3, the trolley 20 shown in Fig. 11 is propelled by drive dog provisions of the power chain 21, and is preferably of the type illustrated and described in a copending application of Paul Klamp, Serial No. 625,646, filed December 3, 1956. It comprises a trolley body rolling on pairs of laterally spaced track rollers 65 which ride the upper flanges of the track channels 18 and 30, as well as depending sets of front and rear guide rollers 66 journaled on vertical axes, which ride within the mutually facing webs of the aforesaid tracks to guide the trolley 20 in its travel. The trolley has a pair of opposed forward and rearward drive dogs 67, 68 pivoted thereon at 69, which dogs are releasably engageable by a knockout spring type chain dog unit 70, to be hereinafter described.

Each trolley 20 has a central hanger 71 fixedly secured thereto and depending between the spaced track channels 18 or 30, and the hanger 71 sustains, in the ordinary fashion, a load carrier bumper 72, the function of which is to prevent impact with the loads on other carriers and possible load damage. It is thus seen that, as the drop frame 32 moves up and down on the guide columns 31, the track sections 30 (with associated control parts to be described) and their load, including the trolley 20 and bumper 72, move therewith, as through the solid and dotted line positions appearing in Fig. 2.

Provision is made, once the trolley 20 has been forwarded onto the drop section 10 and its track 30, to hold the same against further longitudinal movement in either direction, this being accomplished by certain pivotal stop and latching elements on the tracks 30, to be described. Therefore, inasmuch as the conveyor power chain 21 is continuously driven for the purpose of propelling the trolleys about the drop section portion 10 of the system, it is necessary to make provision to drivingly decouple the dog units 70 of this chain from the trolleys, as they come onto the drop section tracks 30 and are positively halted by the pivotal means just referred to.

To this end, the dog units 70 (Fig. 11) each comprise a suitable mounting bracket 74 articulated at its ends to links 75 of the chain 21, the chain being guided and sustained by link hangers 76 carrying rollers 77 riding the flanges of the overhead I-beam chain rail or track 29. The dog bracket 74 has a depending forked extension 79 within which a driving dog 80 of generally L-shaped outline is pivotally mounted at 81. The long arm of the dog 80 is provided at its end with a downwardly facing driving lug 82 engageable behind the forward trolley dog 67 to propel the trolley; while the shorter arm of the dog has a rearwardly extending anchor rod 83 pivoted thereto at 84. A coil compression spring 85 encircles the rod 83 externally of the bracket extension 79, acting between that extension and an enlarged adjustable stop 85' on the rod to urge the dog 80 in clockwise direction, i.e., in a direction to engage downwardly between the trolley dogs 67 and 68.

Therefore, it is seen that when the trolley 20 rides on the drop section tracks 30 and its load or bumper 72 is positively halted against further advance (by the means to be described), the continuing force exerted by power chain 21 of the dog unit or assembly 70 will cause a force couple to arise which tends to shift the dog upwardly from the solid line engaging position of Fig. 11, to the dotted line release position. When this occurs, the trolley 20 is freed from chain 21 and is ready for its vertical traverse on the drop section tracks 30, in the way previously described.

A similar disengagement takes place when a following trolley bumper is halted in advance of drop section 10, assuming the latter is occupied.

The control of the drop section 10, to the end that, once a trolley is present on the tracks 30 a following trolley shall not be permitted to pass onto the drop section, is accomplished by the linkage provisions illustrated in Figs. 2, 7, 9 and 12–14. These provisions include parts moving with the drop section tracks 30 and parts movably mounted upon the fixed superstructure 23.

Included in the parts which move vertically with the drop section are a back stop arm 87 suitably pivoted at 88 on one of the tracks 30, as on a portion of the cantilever spacer 36 which mounts that track, and a further forward stop or latch arm 89 pivotally mounted on the track at 90. These coact with an upwardly projecting stop abutment 91 on each of the hanger carried load bumpers 72.

Referring to Figs. 2 and 9, it is the function of the arm 87 to automatically take position behind the abutment 91 as its trolley enters the drop section, and thereby prevent reverse travel out of the drop section. It is the function of the other arm 89, in the solid line position of Fig. 9, to halt the bumper and trolley by similarly engaging the forward side of the abutment 91, the trolley freeing from chain dog 80 in the way described.

The remaining control element carried by drop section 10 is a latch release rocker 93 having its center pivotally mounted at 94 on a fixed upright bracket 95 on the drop track structure, i.e., one of the mounting spacers 36, in the position shown in Fig. 6 of the drawings.

The rocker 93 has operating rollers 96, 97 journaled between opposite forked extremities thereof, and in the operation of the drop section, these rollers are upwardly engageable with certain further control linkage parts movably mounted upon the superstructure 23, thus to pivotally shift the rocker 93 between solid line and dotted line positions of Fig. 9.

The super-structure mounted linkage just referred to, special reference being had to Figs. 2, 9 and 12–14, includes an L- or bell crank-shaped lever 99 appropriately journaled at 100 on one of the longitudinal superstructure beams 24. It has a generally horizontally disposed, relatively wide arm 101 positioned for operation by the rocker roller 96 and a vertically extending arm 102.

The arm 102 has an elongated rearwardly extending rod or link 103 pivoted to it, and the link 103 is similarly pivoted at its rear extremity to an upward extending arm 104 of a bell crank 105 pivoted on the beam 24 at 106. The other arm 107 of this bell crank carries a terminal pressure foot 108 which engages an anti-friction roller 109 on a latch or stop arm 110 similar to the above described arm 89. The arm 110 is pivotally mounted at 111 on a bracket device 112 supported by one of the tracks 18 and the superstructure 23.

This latch arm sub-assembly is illustrated in Figs. 12, 13 and 14, and the structural arrangement is intended to be employed either as a unit mounted upon the drop section 10 or as a part mounted upon the fixed track superstructure.

The arm 110 (or 89) has a rounded rear extremity 113 engageable with the stop abutment 91 of the trolley bumper 72. As illustrated in Fig. 14, this end is offset laterally at the pivot 111 (or 90), and an adjustable set screw 113' carried by bracket 112 is engageable with a forward portion 114 of the arm, upon which the anti-friction roller 109 is journaled.

A coil tension spring 114 (Fig. 9) acts between a fixed anchor 115 on the superstructure and the bell crank 105 to urge the latter in clockwise direction.

The second roller 97 of the latch release rocker 93 coacts with a swingable stop arm 116 pivotally mounted at 117 in depending relation to the superstructure. This swinging stop has an offset foot 118 normally located directly above the roller 97, so as to engage and halt the latter as the roller 97 ascends with the tracks 30. Spring urged clockwise swing of the arm 116 is limited by an adjustable set screw stop 119, and it is adapted to be swung counterclockwise by means of a link 120 pivoted thereon. This link is pivotally connected at its opposite end to a control arm 121 which is pivoted at 122 on one of the tracks 18, and the control arm 121 has an anti-friction roller 123 journaled on its lower end. Roller 123 is operated to swing the arm clockwise by a bumper 72 of a trolley approaching and entering the drop section 10 (see Fig. 2) in a manner to be described.

The mechanical linkage of the control for the drop section is completed by a second swinging stop arm 125 depending from and pivoted on the superstructure at 126, this arm having its spring-urged counterclockwise motion limited by an adjustable set screw similar to the stop 119, and being engageable from beneath by the anti-friction roller 109 of the latch or stop arm 89 on the drop section. Arm 125 is operatively connected by means of a pivoted link 127 with a bumper actuated control arm 128 pivoted on the beam 24 at 129, and has an anti-friction roller 130 at its lower end for engagement by the bumper 72 of a carrier leaving the drop section.

Control arms 121 and 128 govern the operation of limit switches 131 and 132, respectively, on the fixed superstructure adjacent track structure 18. The limit switch 131 is a normally closed one, but its operating arm 133 is normally held in switch opening position by the control arm 121 described above. When this arm is operated clockwise by a trolley bumper 72, the switch operating arm 133 swings in the same direction and permits the switch 131 to close. The other switch 132 is a normally open one, and its operating arm 134 is struck by a bumper 72 to close the switch.

In the operation of the embodiment shown in Figs. 1-15, it is to be understood that two speed motor 44 is appropriately energized to initiate a downward stroke of the drop section track 30 and trolley load, featuring a relatively rapid initial lowering over a major part of the traverse, and subsequent retardation just prior to the end of the stroke. These speed changes, as well as similar changes on the upward return stroke, are effected under the control of the limit switches 60, 61, 62 and 63 shown in Fig. 3, as operated by segmental plate 58. The switches in question are conventionally wired in an energizing and control circuit in a way which will be evident to those skilled in the art. Track cantilever arms 35 and drop frame are positively driven in both directions by the chains, and it is not believed that further detail description of this phase of the operation is in order. The reversing travel is without interference with any element of the power chain 21 or its driving dog units 70.

In respect to the control linkage and associated provisions shown in Figs. 2, 9 and 10, it will be assumed that the control cycle commences with the drop section moving upwardly, the latch release rocker 93 and latch arms 87, 89 being carried by the tracks 30 and the arms positively restraining trolley 20 from longitudinal movement in either direction. At this time the rearward stop or latch arm 110 is in the "down" position shown in Fig. 2 (dotted line in Fig. 9), engaging the abutment 91 on the bumper 72 next to enter the drop section 10 to hold it from further forward movement. The propelling dogs 80 of the continuously traveling power chain 21 successively engage then yieldably disengage from the drive dog 64 of the trolley associated with that bumper, by the spring overloading operation described in connection with Fig. 11.

The latch release rocker 93 of the drop section moves up until its rear anti-friction roller 97 strikes the bottom of the pivoted stop arm 116, in the solid line position of Fig. 9; and further upward movement causes rocker 93 now to swing clockwise about the axis of the roller 97 as a fulcrum, to the dotted line position of Fig. 9. During this pivotal movement the forward anti-friction roller 96 engages the arm 101 of the L-shaped lever 99 and pivots the latter from the solid line position to the dotted line position.

This draws the elongated link 103 to the left, as viewed in Figs. 2 and 9, swinging the bell crank 105 counterclockwise against the force of spring 114 from the dotted line to the solid line position of Fig. 9. The trolley, and its bumper 72, previously restrained against movement toward the drop section 10, is thus unlatched by the action of the bell crank foot 108 engaging the anti-friction roller 109 of the latch arm 110, freeing the rear end 113 of the arm 110 from the bumper abutment 91. It is now in order for this trolley to advance to drop section, when engaged by the next chain dog 80, since the track 30 is in place and since no trolley will be on the drop section when it arrives.

The last named condition is insured, because coincident with the rise of the drop section tracks, anti-friction roller 109 of the forward stop or latch arm 89 strikes the bottom of the depending pivoted stop arm 125, causing latch 89 to swing counterclockwise about its pivot 90 from solid to dotted line position of Fig. 9. This frees the trolley bumper 72 at that time occupying the drop section for forward movement of the latter onto the fixed tracks 18, when its trolley is engaged by an oncoming drive dog 80.

Leaving the drop section 10, the bumper 72 of the departing carrier strikes the anti-friction roller 130 of the forward control arm 128, swinging the latter clockwise, with a similar swing of the depending stop 125 to take the latter out of obstructing relation to the forward latch arm roller 109, which then drops from the dotted line to the solid line position of Fig. 9. Thus the oncoming trolley and load are halted from further forward movement upon entering the drop section.

The bumper 72 of the entering trolley 20 strikes the anti-friction roller 123 of the rear control arm 121, as indicated in Fig. 2, swinging the latter clockwise about its pivot 122, and occasioning a counterclockwise swing of the depending stop arm 116. This takes the foot 118 of arm 116 out of engagement with rear anti-friction roller 97 of latch release rocker 93, with the result that the rocker returns counterclockwise from its dotted line to its solid line position of Fig. 9, under the force of spring 114 transmitted through the linkage comprised of bell crank 105, link 103 and L-lever 99. This, of course, shifts the bell crank 105 from solid line to dotted line position, permitting the rear latch arm 110 to return to load halting position.

The mechanical parts of the control are all now in condition for the downward traverse and return of the drop section track 30. This condition is set up, in electrical association with limit switches 60–63, under the control of the limit switches 131 and 132 (Fig. 2). That is, when the carrier bumper 72 of the oncoming load strikes and swings control arm 121, the latter allows the operating member 133 of the rear switch 131, previously held open by arm 121, to reset to its normally closed condition. Finally, when the oncoming bumper and its trolley are latched in place on the drop section, the bumper 72 similarly engages and operates the arm 134 of the normally open forward limit switch 132, closing the motor circuit through both of these switches.

The switches 131 and 132 are wired in series, in a way evident to one skilled in the art, so that only when both have been closed may the drop section 10 move downwardly. Its start, two-speed traverse, reversal and halt are governed, among other controls, by the oscillatory limit switches 60–63 of Fig. 3, in a motor control circuit which will suggest itself to one skilled in that art.

The underslung type of drop frame 32 of the embodiment shown in Figs. 1 through 15 is one illustration of a drop mechanism which overcomes the need common in existing drop structures of by-passing the endless overhead power chain to avoid interference and employing reciprocatory pushing and pulling devices at either end of the drop section to move a trolley onto and off of the latter. A further modified embodiment of the invention is illustrated in Figs. 16 and 17 which has the same type of operation advantage, being specially adapted for performing a dip tank operation, as in painting or coating.

In reference to its motor and reducer driving provisions, its mechanical and electrical speed and safety control provisions and in other structural details of minor importance in the invention, the embodiment of Figs. 16 and 17 may be considered to substantially duplicate such provisions as are shown in Figs. 1 through 15. Accordingly, corresponding parts of the two embodiments have been designated by corresponding reference, and further description or explanation will be dispensed with. It is also to be understood that, while certain specific mechanical and electrical means for operation and control have been shown and described, equivalent structures or arrangements for performing the same functions with equal efficiency will readily suggest themselves.

The embodiment of Figs. 16 and 17 dispenses with the U-shaped drop frame characteristic of the other form, inasmuch as its presence is undesirable in a dip tank installation. A conventional dip tank is designated by the reference numeral 135, and floor columns 136, the upper portions of which provide the guide columns 31 of the invention, extend through an angle iron base frame 137 located at the level of the top of the tank 135.

The structure of the guide means and other parts associated with the columns 31 corresponds to what has been described above, including the general shape of the cantilever arm members 35'. However, the sleeves, here specially designated 34', have been modified in that each has welded or otherwise secured thereon an outwardly facing bracket 138 which is equipped at its outer extremity with a guide roller 139. This roller travels within an upright track or way constituted by an inwardly opening angle iron 140 mounted at its base on the base frame 137. The upper ends of the ways 140 are appropriately braced by a transverse angle iron frame 141 (Fig. 17), and this frame includes a pair of horizontal top plates 142, one on either side of the drop tracks 30.

A pair of transversely spaced, vertically elongated power rods 143, threaded throughout the length thereof, are appropriately journaled in the top plates 142 by suitable bearing provisions, which rods are also properly supported for rotation at their bottom extremities, as by bearings 144 on base frame 137.

Above the top plates 142, each of the threaded rods 143 has a bevel gear 145 secured thereon, the gears 145 meshing with further bevel gears 146 on a transverse shaft 147 journaled by spaced bearing blocks 147'. The end of this shaft carries a sprocket 148 about which a drive chain 149 is trained, and it will be understood without further illustration that this chain is drivingly connected with a two speed reversing motor, as by speed reducer provisions of the sort illustrated in Figs. 3 and 4.

The cantilever track supporting members 35' of Figs. 16 and 17 are also modified by the provision of braced horizontal plates 151 with which the screw rods 143 have threaded engagement at 152, so that upon reversing rotation of rods 143 by motor actuation of the chain and sprocket drive connection thereto the cantilever arms 35' raise and lower tracks 30, the motion being well guided by the column wheel sleeves 34' and the guide rollers 139 in vertical ways 140.

As shown in Fig. 16 the bumper 72 of this equipment carries a vertical series of racks 154 to support the work to be dipped in tank 135.

As indicated above, a mechanical control linkage, such as appears in Figs. 2, 9, 10 and 12–14, is provided for the drop section of Figs. 16 and 17, being similarly associated with the vertically movable drop section tracks 30 and the track superstructure of the installation, including an appropriate reversing limit switch unit to govern the start, two-speed traverse, reversal, and halt of the drop section tracks 30.

Furthermore, if desired, screw rod actuation of the track supporting structure of Figs. 16 and 17, may be supplemented by counterweight or counterbalance provisions received internally of the tubular columns 31 and operatively connected to the support structure to assist in the elevation of the tracks, as in the first embodiment of the invention.

What I claim as my invention is:

1. A drop section mechanism for an overload conveyor system characterized by load conveying units propelled along an overhead track having longitudinally spaced track members, under yieldably releasable engagement of said units by an endless driving element, said mechanism comprising a transition track section having transversely spaced track elements and operating vertically in a zone between said longitudinally spaced track members and into and out of registering longitudinal alignment therewith, upon which track section said units are successively received when so aligned, said endless driving element extending horizontally through said zone of operation of said track section to advance a load unit across said aligned track members and section, a vertically movable, upwardly unobstructed support for said track section, including a cross member transversely spanning the space between said track elements, means to drive said support for reverse vertical movements without interference with said endless element, a member adjacent said track section adapted to restrain load units received thereon, and means controlled in response to movement of said support and track section to position said last named member in and out of restraining relation to such load units.

2. A drop section mechanism for an overhead conveyor system characterized by load conveying units propelled along an overhead track having longitudinally spaced track members, under yieldably releasable engagement of said units by an endless driving element, said mechanism comprising a transition track section having transversely spaced track elements and operating vertically in a zone between said longitudinally spaced track members and into and out of registering longitudinal alignment therewith, upon which track section said units are successively received when so aligned, said endless driving element extending horizontally through said zone of operation of said track section to advance a load unit across said aligned track members and section, a vertically movable, upwardly unobstructed support for said track section, means to drive said support for reverse vertical movements without interference with said endless element, said support comprising a fixed vertical guide disposed at one side of said transition track section, a guide member slidable vertically on and guided by said guide, said guide member including a part transversely spanning the space between said track elements and a cantilever member carried by said guide member to which said track section is secured, a member adjacent said track section adapted to restrain load units received thereon, and means controlled in response to movement of said support and track section to position said last named member in and out of restraining relation to such load units.

3. A drop section mechanism for an overhead conveyor system characterized by load conveying units propelled along an overhead track having longitudinally spaced track members, under yieldably releasable engagement of said units by an endless driving element, said mechanism comprising a transition track section having transversely spaced track elements and operating vertically in a zone between said longitudinally spaced track members and into and out of registering longitudinal alignment therewith, upon which track section said units are successively received when so aligned, said endless driving element extending horizontally through said zone of operation of said track section to advance a load unit across said aligned track members and section, a vertically movable, upwardly unobstructed support for said track section, and means to drive said support for reverse vertical movements, without interference with said endless element, said support comprising a U-shaped, upwardly opening drop frame transversely spanning the space between said track elements and provided with vertically disposed guide sleeves on upwardly extending arms thereof, vertical guide columns at either side of said track section which are guidingly engaged by said sleeves, and inwardly facing cantilever members on said guide sleeves which fixedly support said track elements of said transition track section, a member adjacent said track section adapted to restrain load units received thereon, and means controlled in response to movement of said support and track section to position said last named member in and out of restraining relation to such load units.

4. A drop section mechanism for an overhead conveyor system characterized by load conveying units propelled along an overhead track having longitudinally spaced track members, under yieldably releasable engagement of said units by an endless driving element, said mechanism comprising a transition track section having transversely spaced track elements and operating vertically in a zone between said longitudinally spaced track members and into and out of registering longitudinal alignment therewith, upon which track section said units are successively received when so aligned, said endless driving element extending horizontally through said zone of operation of said track section to advance a load unit across said aligned track members and section, a vertically movable, upwardly unobstructed support for said track section, and means to drive said support for reverse vertical movements, without interference with said endless element, said support comprising a U-shaped, upwardly opening drop frame transversely spanning the space between said track elements and provided with vertically disposed guide sleeves on upwardly extending arms thereof, vertical tubular guide columns at either side of said track section which are guidingly engaged by said sleeves, and inwardly facing cantilever members on said guide sleeves which fixedly support said track elements of said transition track section, said driving means comprising a pair of flexible, motor operated power chains operatively connected respectively to said guide sleeves and having portions received within the respective columns.

5. A transfer mechanism for an overhead conveyor system characterized by load conveying units propelled along a track having longitudinally spaced track members, under yieldably releasable engagement of said units by an endless driving element, said mechanism comprising a transition track section operating vertically in a zone between said longitudinally spaced track members and into and out of registering longitudinally alignment therewith, upon which track section said units are successively received when so aligned, said endless driving element extending horizontally through said zone of operation of said track section to advance a load unit across said aligned track members and section, a vertically movable, vertically unobstructed support for said track section, means to drive said support for reverse vertical movements, without interference with said endless element, said support comprising a pair of guide sleeves disposed on opposite sides of said track section and provided with inwardly facing cantilever members on which said transition track section is fixedly secured, and a pair of guide columns slidingly engaged by said guide sleeves, said guide sleeves having anti-friction elements thereon engaging said respective columns and guiding said support in the sliding movement of the sleeves on said columns.

6. A transfer mechanism for an overhead conveyor system characterized by load conveying units propelled along a track having longitudinally spaced track members, under yieldably releasable engagement of said units by an endless driving element, said mechanism comprising a transition track section operating vertically in a zone between said longitudinally spaced track members and into and out of registering longitudinally alignment therewith, upon which track section said units are successively received when so aligned, said endless driving element extending horizontally through said zone of operation of said track section to advance a load unit across said aligned track members and section, a vertically movable, vertically unobstructed support for said track section, means to drive said support for reverse vertical movements, without interference with said endless element, said support comprising a pair of guide sleeves disposed on opposite sides of said track section and provided with inwardly facing cantilever members on which said transition track section is fixedly secured, and a pair of guide columns slidingly engaged by said guide sleeves, said driving means comprising a pair of vertically elongated threaded rods threadedly engaging said cantilever arms to raise and lower said arms and sleeves upon reversing rotation of said rods, said guide sleeves having anti-friction elements thereon engaging said respective columns and guiding said support in the sliding movement of the sleeves on said columns.

7. A transfer mechanism for a conveyor system characterized by a driving device acting to propel load conveying units along a track and through a transfer section zone, which track features spaced track members having adjacent inner ends terminating at side limits of said zone, said mechanism comprising a track section adapted to be operatively positioned in register with said track member ends for the transfer of a load unit from one of said members across said track section to the other track member, a vertically movable support secured to said track section which is characterized by an open, vertically unobstructed and vertically facing portion in the zone of travel of said driving device through said transfer section zone, whereby said support may move said track section without interference with said driving device in any vertical position of said section, means to reversibly move said support vertically, means on said track section releasably engageable with load units advanced onto said track section to halt further movement thereof, yieldable means to release said driving device from propelling engagement with a load unit when the latter is so halted, and means carried by said track section to release said halting means from said engagement with said load units when said track section is in operative position.

8. A transfer mechanism for a conveyor system characterized by an endless driving device acting to propel load conveying units along a track and through a transfer section zone, which track features spaced track members having adjacent inner ends terminating at side limits of said transfer section zone, said mechanism comprising a track section adapted to be operatively positioned in register with said track member ends for the transfer of a load unit from one of said members across said track section to the other track member, means to temporarily halt load units on said one of said members, a vertically movable support secured to said track section which is characterized by an open, vertically unobstructed and vertically facing portion in the zone of travel of said driving device through said transfer section zone, whereby said support may move said track section without interference with said driving device in any vertical position of said section, means to reversibly move said support vertically, means on said track section releasably engageable with load units advanced onto said track section to halt further movement thereof, said endless driving device having driving dogs yieldably releasable from propelling engagement with a load unit when the latter is so halted on said one of said track members, and means on said track section operatively connected to said temporary halting means and said releasably engaging and halting means to place the same in inoperative position when said track section is in register with said track member ends.

9. An overhead conveyor system comprising an endless driving device adapted to propel load conveying units along an elevated track, and a drop section mechanism operatively associated with said track and endless driving device, said track having spaced track portions along which said endless driving device propels said units when said mechanism is in operative position, said mechanism comprising a track section operating vertically in a zone between said spaced track portions, said endless device extending horizontally through said operating zone and being provided with driving dogs yieldably and releasably engaging said load units to propel the latter, means on said track section and on one of said track portions for releasing said engagement when horizontal motion of said units on said track section and on said one of said track portions in advance of said track section is predeterminedly resisted, a vertically movable support for said track section, means to provide for reverse vertical movements of said support without interference with said endless driving device, said first named means comprising a latch device on said track section to engage and halt a load unit on said track section, whereby said unit is released from propelling engagement by said endless driving device, and a control structure to operate said latch device including a latch release member carried by said track section to initiate the release of said latch device from said halting engagement with a load unit.

10. An overhead conveyor system comprising an endless driving device adapted to propel load conveying units along an elevated track, and a drop section mechanism operatively associated with said track and endless driving device, said track having spaced track portions along which said endless driving device propels said units when said mechanism is in operative position, said mechanism comprising a track section operating vertically in a zone between said spaced track portions, said endless device extending horizontally through said operating zone and being provided with driving dogs yieldably and releasably engaging said load units to propel the latter, means on said track section and on one of said track portions for releasing said engagement when horizontal motion of said units on said track section and on said one of said track portions in advance of said track section is predeterminedly resisted, a vertically movable support for said track section, and means to provide for reverse vertical movements of said support without interference with said endless driving device.

11. An overhead conveyor system comprising an endless driving device adapted to propel load conveying units along an elevated track, and a drop section mechanism operatively associated with said track and endless driving device, said track having spaced track portions along which said endless driving device propels said units when said mechanism is in operative position, said mechanism comprising a track section operating vertically in a zone between said spaced track portions, said endless device extending horizontally through said operating zone and being provided with driving dogs releasably engaging said load units to propel the latter, means for releasing said engagement when horizontal motion of said units on said track section and on one of said track portions in advance of said track section is predeterminedly resisted, a vertically movable support for said track section, and means to provide for reverse vertical movements of said support without interference with said endless driving device, said track section and the track portion on the advance side thereof being provided with latch devices to respectively engage and halt a load unit on said track section and to engage and halt a unit approaching said section in the event the latter is occupied by a unit, whereby said units are released from propelling engagement by said endless driving device.

12. An overhead conveyor system comprising an endless driving device adapted to propel load conveying units along an elevated track, and a drop section mechanism operatively associated with said track and endless driving device, said track having spaced track portions along which said endless driving device propels said units when said mechanism is in operative position, said mechanism comprising a track section operating vertically in a zone between said spaced track portions, said endless device extending horizontally through said operating zone and being provided with driving dogs releasably engaging said load units to propel the latter, means for releasing said engagement when horizontal motion of said units on said track section and on one of said track portions in advance of said track section is predeterminedly resisted, a vertically movable support for said track section, and means to provide for reverse vertical movements of said support without interference with said endless driving device, said track section and the track portion on the advance side thereof being provided with latch devices to respectively engage and halt a load unit on said track section and to engage and halt a unit approaching said section in the event the latter is occupied by a unit, whereby said units are released from propelling engagement by said endless driving device, and a control structure to operate said latch devices including a latch release member carried by said track section to initiate the release of said latch devices from said halting engagement with load units.

13. An overhead conveyor system comprising an endless driving device adapted to propel load conveying units along an elevated track, and a drop section mechanism operatively associated with said track and endless driving device, said track having spaced track portions along which said endless driving device propels said units when said mechanism is in operative position, said mechanism comprising a track section operating vertically in a zone between said spaced track portions, said endless device extending horizontally through said operating zone and being provided with driving dogs releasably engaging said load units to propel the latter, means for releasing said engagement when horizontal motion of said units on said track section is predeterminedly resisted, a vertically movable support for said track section, including a cross member spanning the vertical plane of travel of said endless driving device, and means to provide for reverse vertical movements of said support without interference with said endless driving device.

14. An overhead conveyor system comprising an endless driving device adapted to propel load conveying units along an elevated track, and a drop section mechanism operatively associated with said track and endless driving device, said track having spaced track portions along which said endless driving device propels said units when said mechanism is in operative position, said mechanism comprising a track section operating vertically in a zone between said spaced track portions, said endless device extending horizontally through said operating zone and being provided with driving dogs releasably engaging said load units to propel the latter, means for releasing said engagement when horizontal motion of said units on said track section is predeterminedly resisted, a vertically movable support for said track section, including a cross member spanning the vertical plane of travel of said endless driving device, and means to provide for reverse vertical movements of said support without interference with said endless driving device, said track section being provided with a latch device to engage and halt a load unit on said track section, whereby said unit is released from propelling engagement by said endless driving device.

15. A drop section mechanism for an overhead conveyor, comprising an upright tubular column structure, support means externally engaging said column structure for vertical guided movement therealong, a track structure carried by said support means, and means for operating said support means and said track structure vertically along said column structure, including a flexible tension element received within said column structure for vertical movement therein, and means operatively connecting said element means with said support means.

16. A drop section mechanism for an overhead conveyor, comprising an upright tubular column structure including a pair of laterally spaced tubular columns, support means including a pair of cantilever support members externally engaging said columns for vertical guided movement therealong, a track structure carried by said support members, and means for operating said support members and said track structure vertically along said columns, including flexible tension elements received within said respective columns for vertical movement therein, and means operatively connecting said elements with said support members.

17. A drop section mechanism for an overhead conveyor, comprising an upright tubular column structure including a pair of laterally spaced tubular columns, support means including a pair of cantilever support members externally engaging said columns for vertical guided movement therealong, a track structure carried by said support members, and means for operating said support members and said track structure vertically along said columns, including flexible tension elements received within said respective columns for vertical movement therein, and means operatively connecting said elements with said support members, said support members being provided with rollers engaging the exterior of said respective columns in the guiding of said support structure along the latter.

18. A drop section mechanism for an overhead conveyor, comprising laterally spaced, upright members, a vertically movable drop frame of generally U-shaped outline guided by said members, said frame including a pair of support members engaging said upright members for vertical guided movement therealong, a cross member connecting said support members with one another, generally parallel, laterally spaced tracks carried by said support members above said cross member, and means operatively connected to said support members to move the latter vertically along said upright members.

19. A drop section mechanism for an overhead conveyor, comprising laterally spaced, upright columns, a vertically movable drop frame of generally U-shaped outline guided by said columns, said frame including a pair of support members engaging said columns for vertical guided movement therealong, a cross member connecting said support members with one another, cantilever arms movable with said respective support members and having portions extending laterally from one another above said cross member, generally parallel, laterally spaced tracks carried by said cantilever arm portions above said cross member, and means operatively connected to said support members to move the same and said tracks vertically along said columns.

20. A drop section mechanism for an overhead conveyor, comprising laterally spaced, upright tubular columns, a vertically movable drop frame of generally U-shaped outline guided by said columns, said frame including a pair of support members engaging said columns for vertical guided movement therealong, a cross member connecting said support members with one another, cantilever arms movable with said respective support members and having portions extending laterally from one another above said cross member, generally parallel, laterally spaced tracks carried by said cantilever arm portions above said cross member, and means operatively connected to said support members to move the same and said tracks vertically along said columns, including flexible tension elements received within said respective columns for vertical movement therein, and means operatively connecting said elements with said support members.

21. A drop section mechanism for an overhead conveyor, comprising laterally spaced, upright tubular columns, a vertically movable drop frame of generally U-shaped outline guided by said columns, said frame including a pair of support members engaging said columns for vertical guided movement therealong, a cross member connecting said support members with one another, cantilever arms movable with said respective support members and having portions extending laterally from one another above said cross member, generally parallel, laterally spaced tracks carried by said cantilever arm portions above said cross member, and means operatively connected to said support members to move the same and said tracks vertically along said columns, including flexible tension elements received within said respective columns for vertical movement therein, and means operatively connecting said elements with said support members, said support members being provided with rollers engaging the exteriors of said respective columns and guiding said support members along the same.

22. A vertically acting transfer mechanism for association with a conveyor having endless, horizontally traveling means to propel load members along a longitudinal path of travel, comprising means providing laterally spaced upright guides, a vertically movable frame, said frame having portions engaging said guides for vertical movement in opposite directions therealong, and a cross member connecting said portions to one another and spanning the vertical plane in which said propelling means travels, tracks carried by each of said frame portions in vertically spaced relation to said cross member, said tracks being adapted to support load members for travel across said frame, and means operatively connected to said frame to move the same and said tracks vertically.

23. A vertically acting transfer mechanism for association with a conveyor having a longitudinally extending track structure and endless, horizontally traveling means to propel load members therealong, comprising means providing laterally spaced upright guides, a vertically movable frame, said frame having portions engaging said guides for vertical movement in opposite directions therealong toward and away from said track structure, and a cross member connecting said portions to one another and spanning the vertical plane in which said propelling means travels, tracks carried by each of said frame portions on opposite sides of the line of propelling action of said first named means and in vertically spaced relation to said cross member, said tracks being adapted to support load members for travel across said track structure and frame and in position to be engaged and propelled by said first named means, and means operatively connected to said frame to move the same and said tracks vertically.

24. A vertically acting drop mechanism for association with a conveyor having a longitudinally extending track structure and endless, horizontally traveling means to propel load members therealong, comprising means providing laterally spaced upright guides, a vertically movable frame, said frame having portions engaging said guides for vertical movement in opposite directions therealong toward and away from said track structure, and a cross member connecting said portions to one another and spanning the vertical plane in which said propelling means travels, tracks carried by each of said frame portions above said cross member, said tracks being adapted to support load members for travel across said track structure and frame above said cross member and in position to be engaged from above and propelled by said first named means, and means operatively connected to said frame to move the same and said tracks vertically.

25. A transfer mechanism for an overhead conveyor system characterized by load conveying units propelled along a track having longitudinally spaced track members, under yieldably releasable engagement of said units by an endless driving element, said mechanism comprising a transition track section operating vertically in a zone between said longitudinally spaced track members and into and out of registering longitudinal alignment therewith, upon which track section said units are successively received when so aligned, said endless driving element extending horizontally through said zone of operation of said track section to advance a load unit across said aligned track members and section, a vertically movable, vertically unobstructed support for said track section, means to drive said support for reverse vertical movements, without interference with said endless element, said support comprising a pair of guide sleeves disposed on opposite sides of said track section and provided with inwardly facing cantilever members on which said transition track section is fixedly secured, and a pair of guide columns slidingly engaged by said guide sleeves, said driving means comprising a pair of flexible, motor-operated power chains operatively connected respectively to said guide sleeves and having portions received within the respective columns, said guide sleeves having anti-friction elements thereon engaging said respective columns and guiding said support in the sliding movement of the sleeves on said columns.

References Cited in the file of this patent

UNITED STATES PATENTS

| | | |
|---|---|---|
| 1,117,545 | Beausejour | Nov. 17, 1914 |
| 1,150,003 | Focardi | Aug. 10, 1915 |
| 1,482,228 | Hanley | Jan. 29, 1924 |
| 1,772,848 | Walsh | Aug. 12, 1930 |
| 1,819,017 | Drake | Aug. 18, 1931 |
| 2,035,355 | Weise | Mar. 24, 1936 |
| 2,048,937 | Larson | July 28, 1936 |
| 2,161,388 | Rosenthal | June 6, 1939 |
| 2,360,836 | Leopold | Oct. 24, 1944 |
| 2,572,011 | Cohen et al. | Oct. 22, 1951 |
| 2,710,698 | Hauck et al. | June 14, 1955 |
| 2,718,851 | Holdeman | Sept. 27, 1955 |
| 2,738,888 | Todd et al. | Mar. 20, 1956 |
| 2,789,569 | Davis | Apr. 23, 1957 |